United States Patent
Niedermeier

(10) Patent No.: US 8,744,204 B2
(45) Date of Patent: Jun. 3, 2014

(54) METHOD FOR DETECTING A BLOCK RASTER

(75) Inventor: Ulrich Niedermeier, Munich (DE)

(73) Assignee: Entropic Communications, Inc., San Diego, CA (US)

(*) Notice: Subject to any disclaimer, the term of this patent is extended or adjusted under 35 U.S.C. 154(b) by 409 days.

(21) Appl. No.: 13/120,120

(22) PCT Filed: Sep. 21, 2009

(86) PCT No.: PCT/EP2009/062211
§ 371 (c)(1),
(2), (4) Date: Jun. 1, 2011

(87) PCT Pub. No.: WO2010/031868
PCT Pub. Date: Mar. 25, 2010

(65) Prior Publication Data
US 2011/0222780 A1   Sep. 15, 2011

(30) Foreign Application Priority Data
Sep. 22, 2008  (DE) .................... 10 2008 048 257

(51) Int. Cl.
*G06K 9/40*  (2006.01)
(52) U.S. Cl.
USPC ........... 382/263; 382/232; 382/260; 382/261; 382/268
(58) Field of Classification Search
USPC .................. 382/232, 260–261, 263, 266, 268
See application file for complete search history.

(56) References Cited

U.S. PATENT DOCUMENTS

| | | | | |
|---|---|---|---|---|
| 4,546,433 A | * | 10/1985 | Tucker | 382/308 |
| 5,381,354 A | * | 1/1995 | Soloff | 708/301 |
| 5,881,180 A | * | 3/1999 | Chang et al. | 382/268 |
| 5,974,196 A | * | 10/1999 | Chang et al. | 382/268 |
| 6,226,050 B1 | * | 5/2001 | Lee | 348/607 |
| 6,285,801 B1 | * | 9/2001 | Mancuso et al. | 382/268 |
| 6,563,958 B1 | * | 5/2003 | Andrew | 382/268 |
| 6,611,295 B1 | * | 8/2003 | Drouot et al. | 348/607 |

(Continued)

FOREIGN PATENT DOCUMENTS

| | | | | |
|---|---|---|---|---|
| WO | 2007020572 | | 2/2007 | |
| WO | WO 2007020572 A1 | * | 2/2007 | ............... H04N 7/26 |

OTHER PUBLICATIONS

Identification of bitmap compression—Estimation., Fan et al., IEEE, 1057-7149, 2003, pp. 230-235.*
A NO-reference—processing, Muijs et al., EUSIPCO 2005, pp. 1-4.*

(Continued)

*Primary Examiner* — Jayesh A Patel
(74) *Attorney, Agent, or Firm* — Richard Bachand; O'Shea Getz P.C.

(57) ABSTRACT

A method for detecting a block raster in an image comprising a number of pixels, each of which having assigned at least one pixel value, said pixels being arranged one after the other along horizontal and vertical pixel boundaries. The method includes establishing a first raster with raster limits ($x_j$+$dx_j$) that run either parallel to the vertical pixel boundaries or to the horizontal pixel boundaries and, the position of said limits being predetermined by way of an offset (OF) and an opposite distance (SP). A raster scale is determined of the raster as a function of the edge scales of at least some of the raster limits ($x_j$+$dx_j$). The method is repeated for a second raster, and the first or second raster is selected in consideration of the raster scales.

7 Claims, 5 Drawing Sheets

(56) References Cited

U.S. PATENT DOCUMENTS

| | | | |
|---|---|---|---|
| 6,643,410 B1 | 11/2003 | Yu et al. | |
| 6,717,613 B1* | 4/2004 | Osa | 348/222.1 |
| 6,823,089 B1* | 11/2004 | Yu et al. | 382/268 |
| 7,064,793 B2* | 6/2006 | Hahn et al. | 348/619 |
| 7,277,592 B1* | 10/2007 | Lin | 382/268 |
| 7,450,641 B2* | 11/2008 | Sun et al. | 375/240.16 |
| 7,463,688 B2* | 12/2008 | Lin et al. | 375/240.18 |
| 7,620,262 B2* | 11/2009 | Kim et al. | 382/268 |
| 7,715,648 B2* | 5/2010 | Bae et al. | 382/268 |
| 8,040,957 B2* | 10/2011 | Sun et al. | 375/240.29 |
| 8,050,508 B2* | 11/2011 | Peng | 382/260 |
| 8,059,905 B1* | 11/2011 | Christian | 382/254 |
| 8,396,323 B2* | 3/2013 | Huynh-Thu et al. | 382/275 |
| 2005/0100241 A1* | 5/2005 | Kong et al. | 382/268 |
| 2005/0207670 A1* | 9/2005 | Lesellier et al. | 382/275 |
| 2005/0276505 A1* | 12/2005 | Raveendran | 382/268 |
| 2006/0078155 A1 | 4/2006 | Lesellier et al. | |
| 2007/0236601 A1* | 10/2007 | Hahn et al. | 348/441 |
| 2009/0060371 A1* | 3/2009 | Niedermeier et al. | 382/263 |

OTHER PUBLICATIONS

Identification of Bitmaps—Estimation, Zhigang Fan et al., IEEE, 1057-7149, 2003, pp. 230-235.*

Muijs et al. "A No-Reference Blocking Artifact Measure for Adaptive Video Processing", EUSIPCO 2005, 13nd Europ. Sign. Proc. Conf., Turkey, 2005, im Internet abrufbarunter, http://www.eurasip.org/Proceedings/Eusipco/Eusipco2005/defevent/papers/cr1042.pdf.

\* cited by examiner

METHOD FOR DETECTING A BLOCK RASTER

PRIORITY INFORMATION

This patent application claims priority from PCT patent application PCT/EP2009/062211 filed Sep. 21, 2009, which claims priority to German patent application 10 2008 048 257.9 filed Sep. 22, 2008, both of which are hereby incorporated by reference.

BACKGROUND OF THE INVENTION

The present invention relates to a method for the detection of a block raster in image processing.

In image processing it is known that images may be compressed prior to data transmission or storage to reduce the transmission rate or the memory capacity required to store the image. There are methods in which this type of image compression is done in blocks. In these methods, an image to be compressed is divided into a plurality of image blocks, for example image blocks composed of 8×8 pixels, and the image data of the blocks obtained in this manner are compressed all at the same time.

As a result of this block-by-block image processing of an image to be compressed, after a decompression of the image, block-like structures may be present in the decompressed image which are called block artifacts or blocking artifacts. Blocking artifacts of this type are visible edges along the original block boundaries. Blocking artifacts of this type may be detected by appropriate algorithms and may then be removed or at least reduced by appropriate filtering. A method of this type for the reduction of blocking artifacts logically includes a method for the detection of the original block raster. It may thereby be ensured that filtering for the reduction of blocking artifacts takes place only along original block boundaries. This approach eliminates or at least reduces the risk that edges that are part of the image content are erroneously detected as blocking artifacts and are thereby filtered out.

If the block raster is known, i.e., if the position of the block raster within the image and the distances between the individual block boundaries are known, no further effort is necessary. This information about the block raster may then be used directly to search for blocking artifacts only along the block boundaries and to reduce them if necessary.

A more difficult situation arises when an image is scaled after decompression even before additional image processing measures, such as, for example, processes to reduce blocking artifacts, are applied. As a result of an image scaling of this type, visible edges may be "distributed" along the original raster boundaries over a plurality of pixel boundaries. A sudden signal step change at the original raster boundary then results in multiple small signal step changes at neighboring pixel boundaries, which makes it difficult to detect the original block raster.

An object of the present invention is to reliably detect a raster which results, for example, from a block-by-block compression of an image, and specifically when the image has been scaled after the performance of block-by-block processing.

SUMMARY OF THE INVENTION

A method for the detection of a block raster in an image that has a plurality of pixels, to each of which at least one pixel value is assigned and which are adjacent to one another along horizontal and vertical pixel boundaries, comprises:

a) establishing a raster having raster boundaries that run either parallel to the vertical pixel boundaries or parallel to the horizontal pixel boundaries, and the position of which is specified by an offset and a distance from one another;

b) ascertaining a raster dimension of the raster, which is a function of the edge dimensions of at least some of the raster boundaries of the raster;

c) repeating method steps a) and b) at least once for an additional raster;

d) selecting one of the rasters taking into account the raster dimensions ascertained for the individual rasters.

In this method, ascertaining an edge dimension for a raster boundary that lies between two pixel boundaries has the following steps:

b1) Ascertaining an edge dimension to a first pixel boundary which is located next to the raster boundary using a high-pass filtering in a direction perpendicular to the pixel boundary;

b2) Ascertaining an edge dimension to at least one additional pixel boundary which is located next to the raster boundary using a high-pass filtering in a direction perpendicular to the pixel boundary;

b3) Weighting the edge dimensions of the first and at least a second pixel boundary as a function of a distance between the raster boundary and the first pixel boundary and the at least one second pixel boundary.

In this method, the offset and the distance between the raster boundaries may be selected so that raster boundaries of the raster lie at intermediate positions between two pixels.

The edge dimensions of neighboring pixel boundaries therefore influence the edge dimension of such a raster boundary. In this manner, it also becomes possible to detect raster boundaries of the original block raster that were "blurred" over multiple pixel boundaries by a subsequent scaling of the image.

The edge dimension may be an edge dimension of a raster boundary to a pixel boundary.

In one embodiment, the edge dimensions are a function of differences between pixel values of pixels that are located next to one another across the pixel boundaries.

Alternatively or in addition, the edge dimensions are ascertained to at least two pixel boundaries that are located next to the raster boundary. This step is used for ascertaining the edge dimension to the raster boundary that lies between two pixel boundaries. For ascertaining an edge dimension to a raster boundary, edge dimensions may also be ascertained to a plurality of pixel boundaries such as, for example, to each two pixel boundaries on either side of the raster boundary.

The edge dimension to a pixel boundary is designated the pixel boundary dimension.

In one example of the method, it is provided that the edge dimensions ascertained for the individual raster boundaries are added together to thereby obtain the raster dimension of the raster. In an additional example of the method, for the weighted addition of the edge dimensions of pixel boundaries which are next to a raster boundary, these edge dimensions are weighted so that the respective weighting factor decreases in a linear fashion with the distance between the raster boundary and the respective pixel boundary.

The method explained above may be implemented in the vertical direction and in the horizontal direction of the image independently of one another, on one hand to ascertain the raster boundaries of the block raster that run in the vertical direction of the image, and on the other hand, to ascertain raster boundaries of a block raster that run in the horizontal direction of the image.

Exemplary embodiments of the invention are explained in greater detail below with reference to the accompanying figures. These figures are included for the purpose of explaining the basic principle of the method. Therefore only the aspects that are necessary for the explanation of this basic principle are illustrated in the figures. The figures are not necessarily drawn to scale. In the figures, and unless indicated otherwise, the same reference numerals identify identical aspects having the same meaning.

DETAILED DESCRIPTION OF THE INVENTION

Figure 1:
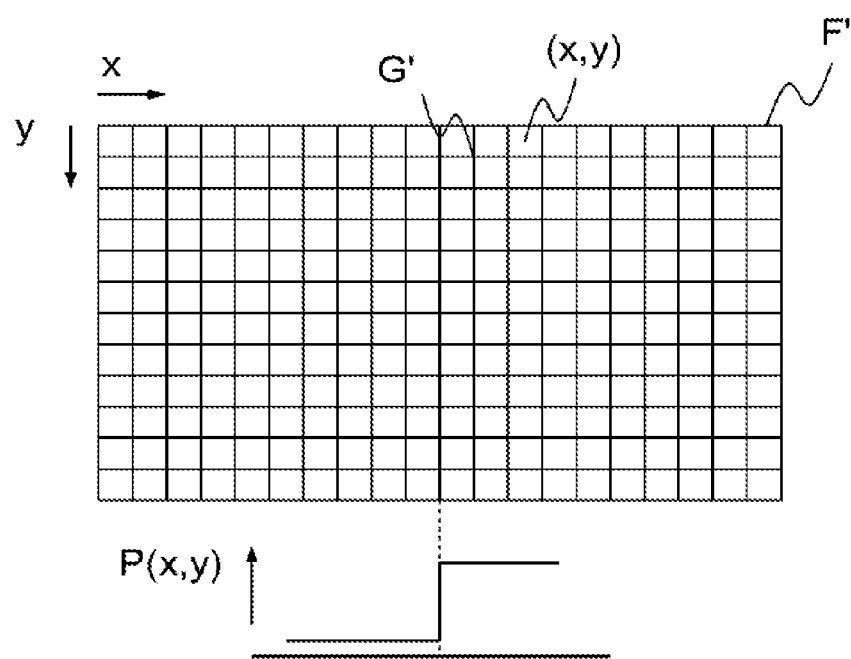
FIG. 1 is a schematic illustration of an image which is divided into individual image blocks, before a scaling.

FIG. 1 illustrates schematically a section of an image F'. This image F' has a plurality of pixels (x, y) which are arranged in a matrix. In FIG. 1, G' is a block raster which divides image F' into individual image blocks. The image blocks each comprise a plurality of pixels arranged in a matrix of 8×8 pixel blocks, for example. Such a division of an image into individual image blocks is used, for example, in coding or compression processes such as the MPEG method, for example, in which pixel values which are assigned to the individual pixels are processed block-wise. In such methods, for example, the pixel values of the pixels of an image block are coded and/or compressed together. Depending on the coding or compression method used, even the coding or compression itself may result in information losses. As a result of these information losses, after a reconstruction of the image on the basis of the previously coded or compressed image data, blocking artifacts may occur along the block boundaries. Such blocking artifacts are in the form of visible edges in the image along the block boundaries and result from a difference between the pixel values of adjacent pixels to the left and right or above and below a block boundary.

FIG. 1 shows such a sudden signal step change or a sudden step-like change in the pixel vales P(x,y) for pixels of an image row through which a horizontal block boundary runs. At this block boundary, the pixel values increase in sudden steps, in the illustrated example from left to right. It should be noted that corresponding signal step changes may of course also occur at horizontal block boundaries.

Figure 2:
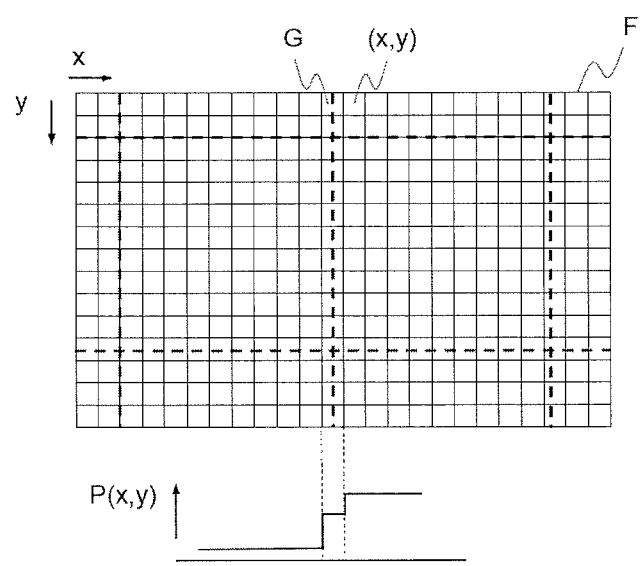
FIG. 2 shows the image after the scaling.

FIG. 2 shows schematically a section of an image F which was obtained by scaling from an image that has previously been processed block-wise, e.g., like image F' illustrated in FIG. 1. During such a scaling, the size of the image is reduced or as in the illustrated example, enlarged. When the image is enlarged, pixels are inserted by interpolation processes, i.e., pixel values for additional pixels are calculated. Interpolation processes of this type are basically known, so that no further explanation is necessary here.

In such methods, a scaling factor causes a change in the image size; there may be different scaling factors for a horizontal image direction and a vertical image direction. In particular for scaling methods in which the scaling factor is not an integer, and in particular is a value for which the product, measured in pixels, of the scaling factor and the width or the height of an image block is not an integer, sudden signal step changes that result in blocking artifacts may be "smoothed out" over a plurality of pixel boundaries. For example, if the block size is 8×8 pixels and the scaling factor is 1.2, for example, the theoretical block size is 9.6×9.6 pixels, and the dimensions of such an image block in pixels are therefore no longer an integer. As also illustrated in FIG. 2, as a result of scaling of this type, in the vicinity of the original block boundaries two or more smaller signal step changes may occur at neighboring pixel boundaries. In this context, a pixel boundary refers to a boundary between two neighboring pixels. Pixel boundaries of this type are either horizontal pixel boundaries that run between pixels that are located next to each other in the vertical direction or vertical pixel boundaries that run between pixels that are located next to each other in the horizontal direction.

Below image F in FIG. 2, pixel values P(x,y) of an image row of the image are illustrated by way of example. In the illustrated example, sudden signal step changes occur at two neighboring vertical pixel boundaries. Step changes of this type at two neighboring pixel boundaries may occur, for example, in those areas of an image which originated from the scaling of an image section which contains a blocking artifact. The sum of the values of these signal step changes may correspond in particular to the value of the signal step change along the block boundary in the unsealed image (see FIG. 1).

In FIG. 2, dashed lines are used to illustrate a block raster G which has been obtained by scaling from the block raster G' illustrated in FIG. 1. In scaling using a scaling factor which is not an integer and has also been selected so that the product of the dimensions of the blocks and the scaling factor is not an integer, the raster boundaries of this raster mathematically lie at intermediate positions between individual pixel boundaries. A division of a signal step change that results in a blocking artifact over two neighboring pixel boundaries occurs in particular where a raster boundary, after the scaling of the image, lies mathematically between two pixel boundaries.

The smoothing out of blocking artifacts or of sudden signal step changes that result in such blocking artifacts over a plurality of pixel boundaries makes the detection of a block raster more difficult. The scaling of an image may of course reduce the effect of individual blocking artifacts by distributing the signal step changes related to the blocking artifact over a plurality of pixel boundaries. Blocking artifacts may still be clearly visible, in particular in cases in which, after the scaling, a block boundary coincides with a pixel boundary. Moreover, the human eye also perceives the "blurred" block boundaries as a regular structure in the image, interpreting it as an interference. To be able to reduce such blocking artifacts overall, it may be necessary to identify the position of the block raster after the scaling of the image. One method, which is suitable in particular for detecting the position of a block raster after image scaling, is explained below. In this context, it should be noted that this method may of course be applied to any arbitrary images that have previously been processed in blocks, i.e., not necessarily only to scaled images.

Figure 3:
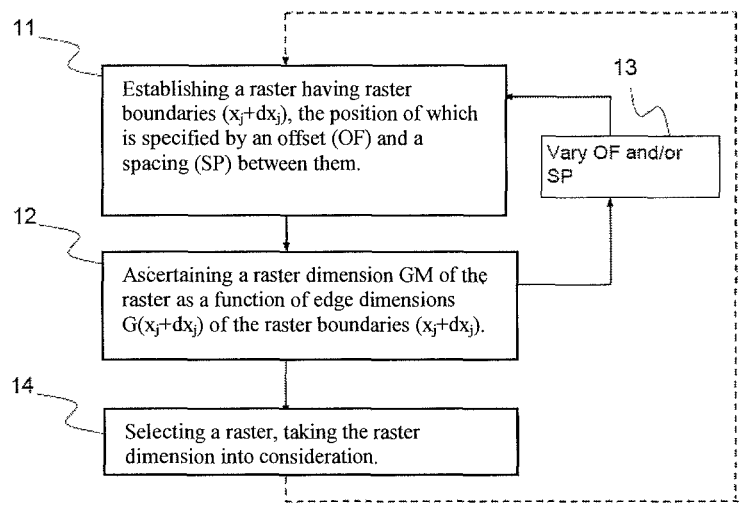
FIG. 3 illustrates a method for ascertaining a block raster on the basis of a block diagram.

FIG. 3 illustrates one example of such a method on the basis of a block diagram. In this method, in a first method step 11a raster having raster boundaries must be established, the position of which is specified by an offset OF and a spacing SP. In FIG. 3, the general raster boundaries of this raster are designated $(x_j+dx_j)$. The individual raster boundaries thereby run parallel to vertical pixel boundaries or parallel to horizontal pixel boundaries of the image.

Figure 4:
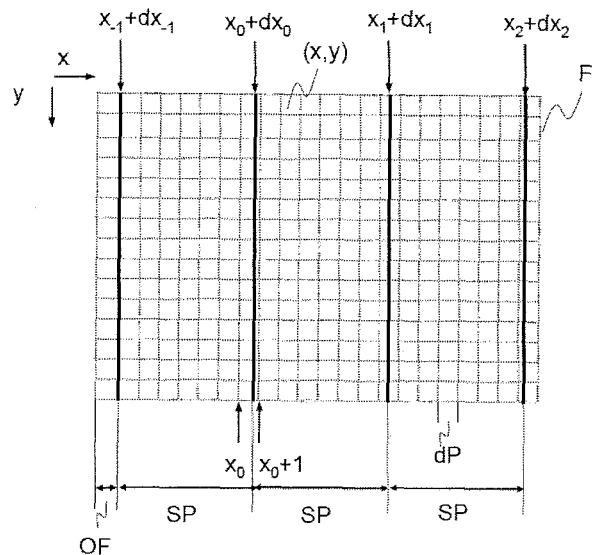
FIG. 4 illustrates a raster having raster boundaries, some of which are located between pixel boundaries of an image.

FIG. 4 is a schematic illustration of a detail of an image F (illustrated in dotted lines) and of a raster located in the image with raster boundaries $x_{-1}+dx_{-1}$, $x_0+dx_0$, $x_1+dx_1$, $x_2+dx_2$ (represented by solid lines). In the illustrated example, these raster boundaries are vertical raster boundaries, i.e., they run parallel to vertical pixel boundaries of the image. In this context, it should be noted that the method explained below may also of course be used on rasters with horizontal raster boundaries, i.e., those raster boundaries that run parallel to horizontal pixel boundaries of the image.

Positions of the individual raster boundaries of the raster are specified by an offset OF and by a spacing SP. In the illustrated example, the individual raster boundaries are at uniform intervals from one another, i.e., a spacing SP which is designated as the raster boundary spacing and is always the same between two neighboring raster boundaries. However, the method explained below is applicable in the same manner to rasters in which the spacing between neighboring raster boundaries is not equal.

Offset OF ascertains the absolute position of the raster having the individual raster boundaries in relation to a reference point inside image F. This reference point is, for example, one edge of the image, i.e., on a raster having vertical raster boundaries, for example, the left or right edge, and on a raster with horizontal raster boundaries, for example, the top or bottom edge of the image. However, the reference point may also be a specified pixel boundary inside the image, such as, for example, the nth pixel boundary from the left or from the right in the case of vertical raster boundaries or from the top or bottom having horizontal raster boundaries, by n being an integer.

In FIG. 4, dP designates a pixel spacing or the spacing between two immediately neighboring pixel boundaries. Both offset OF as well as raster boundary spacing SP may be selected arbitrarily, i.e., they do not necessarily have to be integer multiples of the pixel spacing dP. In one example, both offset OF as well as spacing SP may be varied in steps of dP/256.

With reference to FIG. 3, in an additional method step 12, a raster dimension GM of the previously established raster may be ascertained. This raster dimension is a function of edge dimensions $G(x_j+dx_j)$ of the individual raster boundaries $(x_j+dx_j)$. The calculation of edge dimensions for the individual raster boundaries is explained in greater detail below. Raster dimensions GM are ascertained for a plurality of rasters, i.e., the method steps 11 and 12 (FIG. 3) are performed multiple times, whereby the individual rasters differ in at least one of the values, i.e., offset OF and raster boundary spacing SP, which ascertain the individual rasters. This multiple performance of method steps 11 and 12 is indicated in the block diagram in FIG. 3 by a method step 13 in which offset OF and/or spacing SP are varied, an additional raster being defined by the values thus obtained for offset OF and spacing SP, for which a raster dimension GM is ascertained in method step 12.

In a further method step 14, one of the previously examined rasters is selected, taking into account the raster dimensions ascertained. The raster thus selected may then be used during additional method steps, which are not explained in greater detail below, for the reduction of blocking artifacts.

The ascertainment of a raster dimension on the raster illustrated in FIG. 4 is explained in greater detail below with reference to the accompanying FIGS. 4 to 6. In this method, an edge dimension is ascertained on at least one of the raster boundaries that are part of the raster. One example of a method for ascertaining such an edge dimension on a raster boundary is explained below for the raster boundary $x_0+dx_0$ illustrated in FIG. 4. This raster boundary lies between two pixel boundaries which are designated $x_0$ and $x_0+1$ in FIG. 4.

Figure 5:
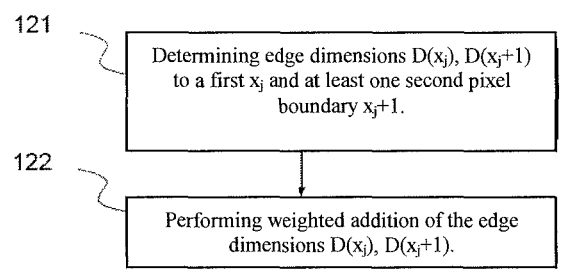
FIG. 5 illustrates one of the steps of the method in detail on the basis of a block diagram.

For ascertaining an edge dimension on a raster boundary $x_0+dx_0$ that lies between two pixel boundaries, with reference to FIG. 5, in a first method step 121, edge dimensions are ascertained on at least two pixel boundaries that are located next to the raster boundary. For purposes of this explanation, it is assumed that for ascertaining an edge dimension on raster boundary $x_0+dx_0$, edge dimensions $D(x_0)$, $D(x_0+1)$ to the pixel boundaries $x_0$ and $x_0+1$ are ascertained, between which the raster boundary $x_0+dx_0$ lies. It should be noted that for ascertaining an edge dimension to a raster boundary, edge dimensions to a plurality of pixel boundaries may be ascertained such as, for example, each two pixel boundaries on both sides of the raster boundary. With reference to the example illustrated in FIG. 4, that means that one edge dimension is ascertained to a plurality of pixel boundaries, e.g., each two pixel boundaries to the left of the raster boundary $x_0+dx_0$ and two raster boundaries to the right of the raster boundary $x_0+dx_0$. The edge dimension of a pixel boundary is also called the pixel boundary dimension below.

The ascertainment of an edge dimension to a pixel boundary includes a high-pass filtering of pixels which are next to each other across the pixel boundary. This high-pass filtering includes, for example, the selection of a plurality of pixel groups, each of which has pixels which are located next to one another across the pixel boundary, a high-pass filtering of the individual pixels of these pixel groups and an addition of the absolute high-pass filter values thus obtained. In this context, the absolute value is a measurement for the absolute amount. This amount may be the absolute amount, although it may also be an arbitrary function, which is identical for all high-pass filter values.

In the example illustrated in FIG. 4, in which edge dimensions are ascertained on vertical pixel boundaries $x_0$, $x_0+1$, for example, a plurality of rows of the image and within these rows a plurality of pixels which are located next to one another across the respective pixel boundary, are selected and subjected to a high-pass filtering. For ascertaining edge dimensions on horizontal pixel boundaries, in a corresponding manner columns of pixels which are located next to one another across the respective pixel boundaries are selected.

Figure 6:
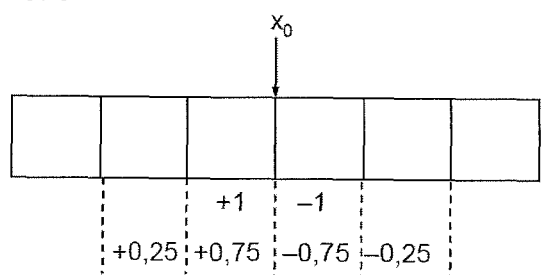
FIG. 6 illustrates a method for high-pass filtering across a pixel boundary.

FIG. 6 is a schematic illustration of a group of pixels which are located next to one another across a pixel boundary—in this example the pixel boundary $x_0$. High-pass filtering of the pixels of this pixel group, i.e., the ascertaining a high-pass filter value for the pixels of this pixel group, may be performed in any desired manner. In one example, the high-pass filtering includes the formation of a difference between the pixel values of the two pixels which are immediately adjacent at the pixel boundary $x_0$. In this case, the high-pass filter function has the filter coefficients +1, −1. Of course, more complex high-pass filter functions are also possible, e.g., high-pass filter functions that take into consideration more than one pixel on each side of the pixel boundary, in particular the weighting of the individual pixels in the filtering being greater, the closer the pixels lie to the pixel boundary. A high-pass filter function of this type is, for example, a high-pass filter function having the filter coefficients +0.25, +0.75, −0.75, −0.25. The filter coefficients for these two examples of high-pass filter functions are illustrated in FIG. 4 below the schematically illustrated individual pixels.

High-pass filtering for ascertaining a high-pass filter value on the pixels of a pixel group does not necessarily include only linear operations of the type that are present in the two high-pass filter functions explained above. For example, it is possible to set an upper boundary on the filter values for the individual pixel groups obtained by a linear high-pass filtering, to thereby obtain the high-pass filter values for these pixel groups. A limitation of this type prevents very steep individual edges in the image from exerting an excessive influence on the ascertainment of the pixel boundary dimension.

In an additional example, the filter values obtained by a linear high-pass filtering must be subjected to a threshold decision, and a first value (e.g., 1) is output as the high-pass filter value for a pixel group if the filter value lies above the threshold value, and otherwise a second value (e.g., 0) is output.

High-pass filtering of this type may be performed for all pixel groups that are located next to one another along a given pixel boundary, and specifically in a direction parallel to the pixel boundary. Of course it is also possible to select only individual pixel groups that contain pixels that are next to one another across the respective pixel boundary. The absolute amounts of the high-pass filter values that are ascertained for the individual picture group are added, for example, the sum thereby obtained representing an edge dimension for the respective pixel boundary. In this context it should be noted that for ascertaining the edge dimensions of individual pixel boundaries, a different number of high-pass filter values may be calculated for the individual pixel boundaries. In that case, the sum of the individual high-pass filter values, which represents the edge dimension of the respective pixel boundary, must be appropriately normalized.

With reference to FIG. 5, the edge dimension to a raster boundary $x_0+dx_0$ is ascertained in a method step 122 by the weighted addition of the edge dimensions of the pixel boundaries that lie next to the raster boundary. For the edge dimension of the raster boundary $x_0+dx_0$, for example:

$$G(x_0+dx_0)=a \cdot D(x_0)+b \cdot D(x_0+1) \quad (1a),$$

where $G(x_0+dx_0)$ is the edge dimension of the raster boundary $x_0+dx_0$, $D(x_0)$, $D(x_0+1)$ are the edge dimensions (pixel boundary dimensions) of pixel boundaries $x_0$, $x_0+1$, and a and b are the weighting factors. For the weighting factors, for example, $0 \le a, b \le 1$ and $a+b=1$.

The position of a raster boundary in the raster is a function of offset OF and raster boundary spacing SP, and may generally be represented as $SP \cdot j+OF$, where the variable j is an integer which indicates the individual raster boundaries of a raster. In that case, for the edge dimension of the raster boundary:

$$G(SP \cdot j+OF)=g_1(j)D(\lfloor SP \cdot j+OF \rfloor)+g_2(j)D(\lfloor SP \cdot j+OF \rfloor+1)|(1b)$$

where ($\lfloor SP \cdot j+OF \rfloor$) designates the position of a first of the two pixel boundaries that are next to the raster boundary and ($\lfloor SP \cdot j+OF \rfloor$)+1 designates the position of a second of the two neighboring pixel boundaries. With pixel boundaries that run vertically and when the index j is selected so that raster boundaries are arranged sequentially with an increasing index from left to right in the image, the first pixel boundary is the pixel boundary lying to the left of the raster boundary and the second pixel boundary is the pixel boundary lying to the right of the raster boundary. $\lfloor . \rfloor$ in Equation (1b) indicates a rounding-down operation to the next-lower integer.

Raster dimension GM for a raster is obtained, for example, by forming at least some of the raster boundaries of this raster and adding them up, i.e.,:

$$\text{where } GM = \sum_i G(x_i + dx_i). \quad (2)$$

GM(OF,SP) stands for the raster dimension of a raster described by an offset value OF and a spacing SP.

$x_i+dx_i$ designates any of the raster boundaries of this raster and $G(x_i+dx_i)$ designates the edge dimension of this raster boundary. For ascertaining the raster dimension of a raster, edge dimensions to all raster boundaries may be ascertained and added up. It is also possible to ascertain edge dimensions to only some of the raster boundaries and to add up the edge dimensions of these raster boundaries. Instead of this amount, integer powers of the edge dimensions may also be formed.

In the method explained above, in which the edge dimensions on the individual raster boundaries are a function of differences between pixel values of those pixels that are located next to one another across the pixel boundaries, the more frequently there are step changes between pixel values of those pixels that lie next to such pixel boundaries, the greater the raster dimension. In that case, for example, the raster selected is the one whose raster dimension is the largest in comparison to the raster dimensions of the other rasters.

Figure 7:
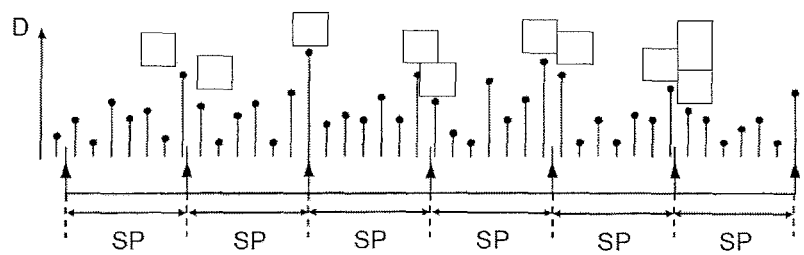
FIG. 7 illustrates one example for edge dimensions of pixel boundaries which were ascertained for an image.

FIG. 7 illustrates by way of example edge dimensions that are obtained at pixel boundaries [of the] image.

Figure 8:
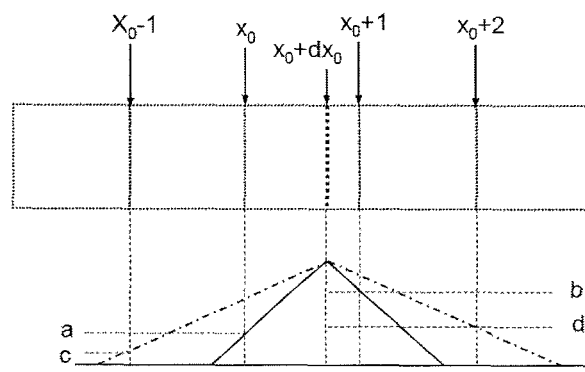
FIG. 8 illustrates a method for the weighting of the edge dimensions of pixel boundaries that are located next to a raster boundary.

In one example of a method for ascertaining the edge dimension of a raster boundary, the edge dimensions of the pixel boundaries next to the raster boundary are weighted so that the weighting factors (a, b in Equation (1a) or $g_1(j)$, $g_2(j)$ in Equation (1b)), decrease in linear fashion with the distance of the respective pixel boundary from the raster boundary. FIG. 8 illustrates the determination of the weighting factors a, b in such a method. FIG. 8 shows the raster boundary $x_0+dx_0$, as well as the pixel boundaries $x_0$, $x_0+1$ and two linear functions, each of which decreases with increasing distance from the raster boundary $x_0+dx_0$. The weighting factors a, b are ascertained by these linear functions. In the illustrated example, the weighting factor a is a function of the distance $dx_0$ between the first pixel boundary $x_0$ and the raster boundary $x_0+dx_0$ and is proportional to this distance. The second weighting factor b is a function of the distance between the pixel boundary $x_0+1$ and the raster boundary $x_0+dx_0$, i.e., in this case, it is a function of and proportional to $dP-dx_0$, dP being the distance between the pixel boundaries $x_0$, $x_0+1$.

The linear functions illustrated in FIG. 8 are selected so that they are zero for distances from the raster boundary $x_0+dx_0$ that are greater than the pixel distance dP. In this case, for the determination of an edge dimension to the raster boundary, only two pixel boundaries are taken into consideration which are located next to the raster boundary.

The weighting factors in Equation (1b) for a raster boundary, which generally lies in a position $SP \cdot j+OF$ may be ascertained as follows:

$$g_1(j) = 1 - \frac{(SP \cdot j + OF), \text{mod}(dP)}{dP} \quad (3a)$$

$$g_2(j) = \frac{(SP \cdot j + OF) \bmod(dP)}{dP} \quad (3b)$$

where mod(.) stands for a modulo operation. If the position of the raster boundary SP·j+OF coincides with a pixel boundary, then: (SP·j+OF)mod(dP)=0. In this case, the first weighting factor $g_1(j)$ equals 1 and the second weighting factor $g_2(j)=1$ is 0. If the raster boundary lies in the middle between two pixel boundaries, for example, then: (SP·j+OF)mod(dP)=0.5. In this case, both weighting factors are equal, i.e., 0.5.

As illustrated by the broken lines in FIG. 8, the linear functions may also be selected so that they are also greater than 0 for distance values that are greater than the pixel distance dP. In this case, for ascertaining the edge dimension to the raster boundary, the edge dimensions of additional pixel boundaries are also taken into consideration, as in the illustrated example the edge dimension to the pixel boundary $x_0+2$, which is then weighted with a weighting factor c which is proportional to the distance between raster boundary $x_0+dx_0$ and this pixel boundary $x_0+2$. In general the following equation applies for ascertaining an edge dimension to a raster boundary, such as, for example, the $x_0+dx_0$, therefore:

$$G(x_0 + dx_0) = \sum_i k_i \cdot D(x_0 + i) \quad (3)$$

where $D(x_0+i)$ indicates the edge dimension (pixel boundary dimension) of a pixel boundary $x_0+1$ and $k_i$ indicates the weighting factor ascertained for these pixel boundaries on the basis of a linear function. The function illustrated in dotted lines in FIG. 8 assumes values greater than zero for distances d to the raster boundary for which d<|2·dP| applies and is otherwise zero. On the basis of this function, weighting factors to four raster boundaries $x_0-1$, $x_0$, $x_0+1$ and $x_0+2$ may be ascertained. With reference to Equation (3), therefore: i=−1, 0, +1, +2.

Figure 9:
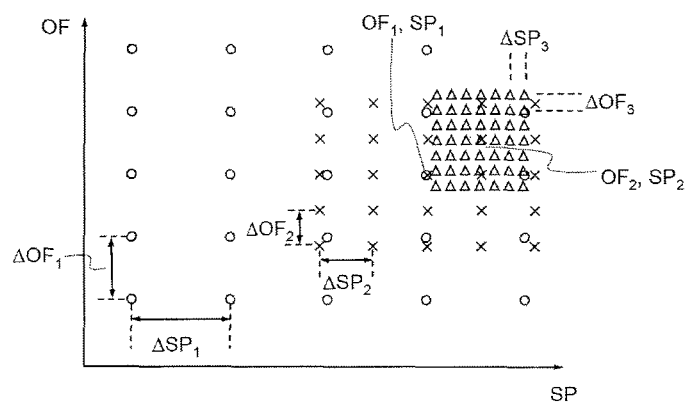
FIG. 9 illustrates the selection of an offset and a reciprocal distance for raster boundaries of a raster.

As explained above, the position of the raster boundaries is a function of offset OF and spacing SP between the individual raster boundaries. For ascertaining a raster, a value range from which the offset values originated may be specified. Accordingly, a value range may be specified for the spacing values SP from which the individual spacings SP originated. For ascertaining the raster it is possible to ascertain the spacing dimensions for rasters of all possible combinations of offset values and raster boundary spacings. Such a method may require a great deal of computational effort, however, if a large number of possible offset values and a large number of possible spacing values are specified. To reduce the amount of computing time, in one example the method for the detection of a raster is performed hierarchically, which is explained below with reference to the accompanying FIG. 9. FIG. 9 illustrates, a matrix in which spacing values SP and offset values OF are plotted, rasters for which raster dimensions are ascertained, on the basis of the value pairs associated with the individual rasters, each having an offset value OF and a spacing value SP. Circles identify the rasters for which spacings are ascertained during a first processing cycle. These rasters are selected so that their offset values differ at least by a value $\Delta OF_1$ and their spacing values differ at least by a value $\Delta SP_1$, $OF_1$, $SP_1$ in FIG. 9 indicate the value pair of the raster for which the best raster dimension was ascertained during the first processing cycle. Starting from this value pair $OF_1$, $SP_1$ additional rasters are then investigated, the offset values of these rasters differing at least by a value $\Delta OF_2$ which is less than the value $\Delta OF_2$ and the spacing values differing by a value $\Delta SP_2$ which is less than the value $\Delta SP_1$. These value pairs are selected from a two-dimensional value range which differs in terms of the offset value and in terms of the spacing value by a maximum of a specified value from offset $OF_1$ and spacing value $SP_1$ of the previously ascertained raster.

In FIG. 9, $OF_2$, $SP_2$ designates the value pair of a raster for which the best raster dimension was ascertained during this processing cycle. Starting from this value pair, the search is then increasingly refined by then searching for rasters, the value pair of which comes from a two-dimensional value range which is located around this value pair $OF_2$, $SP_2$, the spacing of the individual value pairs being further refined from the spacing of the value pairs during the preceding processing cycle. Thus the difference of the offset values in this search is only $\Delta OF_3$, and the difference of the space values is only $\Delta SP_S$.

A hierarchical method of this type may be continued until rasters are investigated, the value pairs of which differ with regard to both the offset and with regard to the spacing by only a minimum possible amount which—as noted above—is dP/256, for example. Depending on the amount of computation capacity that may or must be used, of course, this minimum value may also be selected as some other value, e.g., dP/4, dP/8 or in general $dP/2^k$, k being an integer greater than 1. Of course any other fractions of minimum pixel spacing dP may also be set as the minimum values.

In the hierarchical processing method explained above, a starting value for raster boundary spacing SP may be ascertained, for example, by first ascertaining edge dimensions for all pixel boundaries, the result of which is illustrated in FIG. 7. In the "histogram" this obtained, local peaks are then ascertained and the spacings between neighboring local peaks are ascertained. The starting value may be selected as a function of the spacings ascertained in this manner. In one example, the starting value for raster boundary spacing SP equals the most frequently occurring spacing between local extreme values; in another example, the starting value corresponds to a weighted average of the two or more most frequently occurring spacing values. The weighting factors may decrease with decreasing frequency of the spacing values and, for example, may be a direct function of the frequency.

In the example explained above, the raster is based on a model having two degrees of freedom, offset OF and spacing SP, i.e., the position of the individual raster boundaries is a function of two parameters. For each raster for which a raster dimension is ascertained in this case, the individual raster boundaries are uniformly spaced. The processing method explained above may be applied in the same manner to rasters which are based on a model having more than two degrees of freedom. For example, rasters may be used in which the spacings between the individual raster boundaries are not identical. These raster spaces may vary, for example, as a function of the position of the raster boundaries within the image. Using a raster of this type having variable raster spacings is appropriate, for example, in cases where individual image segments of an image are scaled using different scaling factors. That is the case, for example, when what are termed "panorama scalers" are used for the image scaling. Such "panorama scalers," for example, scale image segments in the middle of an image at a scaling factor which is different from the one used in the peripheral areas of the image.

Although the present invention has been illustrated and described with respect to several preferred embodiments thereof, various changes, omissions and additions to the form and detail thereof, may be made therein, without departing from the spirit and scope of the invention.

What is claimed is:

1. A method for the detection of a block raster in an image which has a plurality of pixels, to each of which at least one pixel value is assigned and which are adjacent to one another along horizontal and vertical pixel boundaries ($x_j$, $x_j+1$) the method comprising:
- a) establishing a first raster having raster boundaries ($x_j+dx_j$), which run either parallel to the vertical pixel boundaries or parallel to the horizontal pixel boundaries, and the position of which is specified by an offset (OF) and a spacing (SP) between them;
- b) ascertaining a raster dimension that is a function of edge dimensions of at least some of the raster boundaries ($x_j+dx_j$);
- determining of an edge dimension on a raster boundary that lies between two pixel boundaries comprising the following steps
- b1) ascertaining an edge dimension of a first pixel boundary which is next to the raster boundary using a high-pass filtering in a direction perpendicular to the first pixel boundary;
- b2) ascertaining an edge dimension of a second pixel boundary which is located next to the raster boundary using a high-pass filtering in a direction perpendicular to the second pixel boundary;
- b3) weighting the edge dimensions of the first and second pixel boundaries as a function of the spacing between the raster boundary and the first pixel boundary and the second pixel boundary;
- c) repeating the method steps a) and b) for a second raster;
- d) selecting one of the first and second rasters taking into account the ascertained edge dimensions thereof.

2. The method as recited in claim 1, in which in step b), the edge dimensions of at least some of the raster boundaries are added together to ascertain the raster dimension.

3. The method as recited in claim 1, in which in step b) the edge dimension to a first pixel boundary which is located on a first side next to the raster boundary is ascertained and in the same manner to a second pixel boundary which is located next to the raster boundary on a second side opposite to the first side.

4. The method as recited in claim 3, weighting the edge dimensions produces a weighting factor that decreases in a linear manner with the distance between the raster boundary and a respective pixel boundary.

5. The method as recited in claim 1, in which the high-pass filtering of steps b1) and b2) each comprise:
- selecting pixel groups, each of which has at least two pixels, one of which is located on a first side next to a pixel boundary and another of which is located next to a pixel boundary on a second side which is opposite to the first side;
- using a high-pass filtering on the pixel of each of the selected pixel groups to obtain a high-pass filter value for each of them; and
- adding the absolute amounts of the individual high-pass filter values.

6. The method as recited in claim 5 in which each pixel group comprises two pixels, a first of which is adjacent to the pixel boundary on the first side and a second of which is adjacent to the pixel boundary on the second side.

7. The method as recited in claim 1, in which the method steps a) to d) are each performed in sequence at least twice.

* * * * *